United States Patent
Schwarz et al.

(10) Patent No.: US 6,845,571 B1
(45) Date of Patent: Jan. 25, 2005

(54) SPRAY-DRYING INSTALLATION AND A METHOD FOR USING THE SAME

(75) Inventors: Eugen Schwarz, Bensheim (DE); Gernot Moeschl, Weiterstadt (DE); Hanspeter Ruetzler, Neuenweg (DE); Jean-Marc Dutter, Hegenheim (FR)

(73) Assignee: Merck Patent GmbH, Darmstadt (DE)

( * ) Notice: Subject to any disclaimer, the term of this patent is extended or adjusted under 35 U.S.C. 154(b) by 87 days.

(21) Appl. No.: 10/009,487

(22) PCT Filed: Jun. 6, 2000

(86) PCT No.: PCT/EP00/05183
§ 371 (c)(1),
(2), (4) Date: Dec. 13, 2001

(87) PCT Pub. No.: WO00/76650
PCT Pub. Date: Dec. 21, 2000

(30) Foreign Application Priority Data

Jun. 16, 1999 (DE) .......................... 199 27 537

(51) Int. Cl.⁷ .............................................. F26B 17/00
(52) U.S. Cl. .............................. 34/375; 34/576; 34/372
(58) Field of Search .................... 34/375, 585, 582, 34/578, 576, 372, 373, 374; 23/313 FB; 426/594, 596, 588, 494

(56) References Cited

U.S. PATENT DOCUMENTS

| | | | | |
|---|---|---|---|---|
| 2,921,383 A | * | 1/1960 | Morris | 34/57 |
| 5,100,509 A | * | 3/1992 | Pisecky et al. | 159/4.2 |
| 5,149,398 A | * | 9/1992 | Shaffer et al. | 159/4.01 |
| 5,294,298 A | * | 3/1994 | Maesaka et al. | 159/4.01 |
| 5,556,274 A | * | 9/1996 | Ettie et al. | 432/159 |
| 5,632,100 A | * | 5/1997 | Hansen | 34/374 |
| 5,695,614 A | * | 12/1997 | Hording et al. | 203/10 |
| 6,253,463 B1 | * | 7/2001 | Hansen | 34/362 |
| 6,536,133 B1 | * | 3/2003 | Snaper | 34/265 |

FOREIGN PATENT DOCUMENTS

| | | |
|---|---|---|
| EP | 0212714 A | 3/1987 |
| EP | 0378498 A | 7/1990 |
| EP | 0749769 A | 12/1996 |
| NL | 8602952 A | 6/1988 |

* cited by examiner

Primary Examiner—Kenneth Rinehart
(74) Attorney, Agent, or Firm—Millen White Zelano & Branigan, P.C.

(57) ABSTRACT

The invention can relate to a fluidized bed apparatus with an integrated spray-drying device and to a method for using the same. The invention also can relate to a method for producing a spray-dried powder material, whose product characteristics can be specifically adapted according to the ulterior use of the material.

17 Claims, 2 Drawing Sheets

1. Liquid
2. Heating medium inflow and return
3. Spray air
4. Powder return
5. Hot air

SPRAY-DRYING INSTALLATION AND A METHOD FOR USING THE SAME

The invention relates to a fluidized-bed apparatus with integrated spray drying and to a process for the use thereof. The invention also relates to a process for the production of spray-dried powder material whose product properties can be varied in a targeted manner depending on the further use.

Commercially available granular materials are usually produced by spraying a solution or suspension of one or more components into a spray tower charged with hot gas. In the stream of hot gas, the liquid components evaporate, and solid particles which have a more or less random shape form.

Also known is granulation in a fluidized bed, in which the stream of process air flows through a specially shaped feed base, generating a fluidized bed of solid starting material. The spray liquid enters the fluidizing space in finely divided form through a nozzle system. The fluidizing particles are wetted, the surface is partially dissolved, and the particles adhere together. At the end of the fluidized bed, solid is removed continuously. At the same time, a smaller amount of solid finely divided in the spray liquid is fed in at the inlet. A filter system prevents dust leaving the fluidized bed and ensures that only granular material particles having a minimum size are removed at the outlet. Solid particles with a more less random shape likewise form in a fluidized bed of this type.

It is therefore an object of the invention to provide a suitable plant and a process for operating the plant with the aid of which properties of spray-dried or granulated, pulverulent products can be varied as desired with respect to particle size, particle size distribution, moisture content and tabletting ability.

The object is achieved by a spray-drying plant which has a) a spray-drying unit (B)

b) a fluidized bed (A)

c) one or more additional spray or atomization nozzles for liquid media (C)

e) a powder metering device (D)

f) a powder return (9) with fan (E).

In the spray-drying unit of the spray-drying plant according to the invention, (B) liquid medium (5), spray air (6), pulverulent material (9) and hot air (4) are combined.

A particular embodiment consists in that a spray-drying unit (B) is located vertically above a downstream fluidized bed in a spray tower.

In a specific embodiment, the spray-drying unit (B) of the plant can comprise a spray system which consists of a two-component spray nozzle heated by hot water with coaxially arranged powder return and hot-gas surrounding flow.

The object is achieved, in particular, by a plant in which one or more additional spray or atomization nozzles for liquid media (C) can be installed in the fluidized bed at variable locations. In accordance with the present invention, the fluidized bed is followed by a powder metering device (D), which is separated off by a paddle valve (F) and is fed by an overflow (8).

Some of the product formed can, in accordance with the invention, be returned, if desired after comminution, into the spray-drying unit (B) via a fly conveyor, in which a fan (E) serves as conveying element. The fan (E) acting as conveying element can simultaneously serve as comminution unit for the returned powder.

The object is also achieved by a process for the production of spray-dried powder material in which a) in a first step, a liquid medium, spray gas, pulverulent material and hot air are combined, b) the pulverulent product formed falls into a fluidized bed, is taken up, fluidized and transported further, c) in one or more granulation step(s), is sprayed with further liquid medium, dried and conveyed in the fluidized bed toward the powder metering device, from which d) some of the pulverulent material is returned into the process.

The liquid medium is a solution, a dispersion or a suspension.

A particular variant of the process consists in that the returned pulverulent material is comminuted before return.

The spray gas, carrier gas and heating gas used can be air or an inert gas selected from the group consisting of $N_2$, and $CO_2$. The gas can, in accordance with the invention, be circulated, in which case it is freed from particles by means of filters or with the aid of dynamic filters and fed back to the spray nozzles or heated and introduced into the fluidized bed.

In accordance with the invention, liquid media used at various points of the plant can have different compositions.

The present object is also achieved, in particular, by allowing particle sizes of from 50 to 1000 μm to become established specifically by varying the parameters spray pressure, amount of liquid, amount of powder returned, hot-air stream and temperature of the hot air.

In order to carry out the process, the plant is charged at the beginning with pulverulent starting material via the fill port (3). A stream of air is generated in the spray-drying space via the chambers (1). The starting material introduced is fluidized by this stream of air and moves toward the discharge flap (F). The stream of powder is given this movement direction on generation of the stream of air by an appropriate perforation of the Conidur base. The fluidized product can be discharged by simply opening the paddle valve (F). At this point of the plant, devices are provided which enable the product to be fed either into a powder metering device or via a fly conveyor to the spray-drying unit. An overflow (8) for the finished product is located at the outlet above the powder metering device. The fan (E) of the spray-drying unit serves both as conveying means for the product and as comminution unit for powder material to be returned. Through a particular design of the spray-drying nozzle, returned powder material from the return line (9) is combined with the corresponding media liquid (5), spray air (6) and hot air (4). The powder or granular material formed is taken up by the fluidized bed and transported further as already described above. On passing through the granulation nozzles (C), further medium, which may have a different composition to the medium introduced into the spray nozzle with powder return, is sprayed onto the particles formed. Further granulation and re-setting of the particle size distribution take place. Air introduced from the chambers (1) via the Conidur bases will dry the product to the desired final moisture content. A dynamic filter (G) integrated into the plant will prevent discharge of powder particles into the environment.

Figure 1:
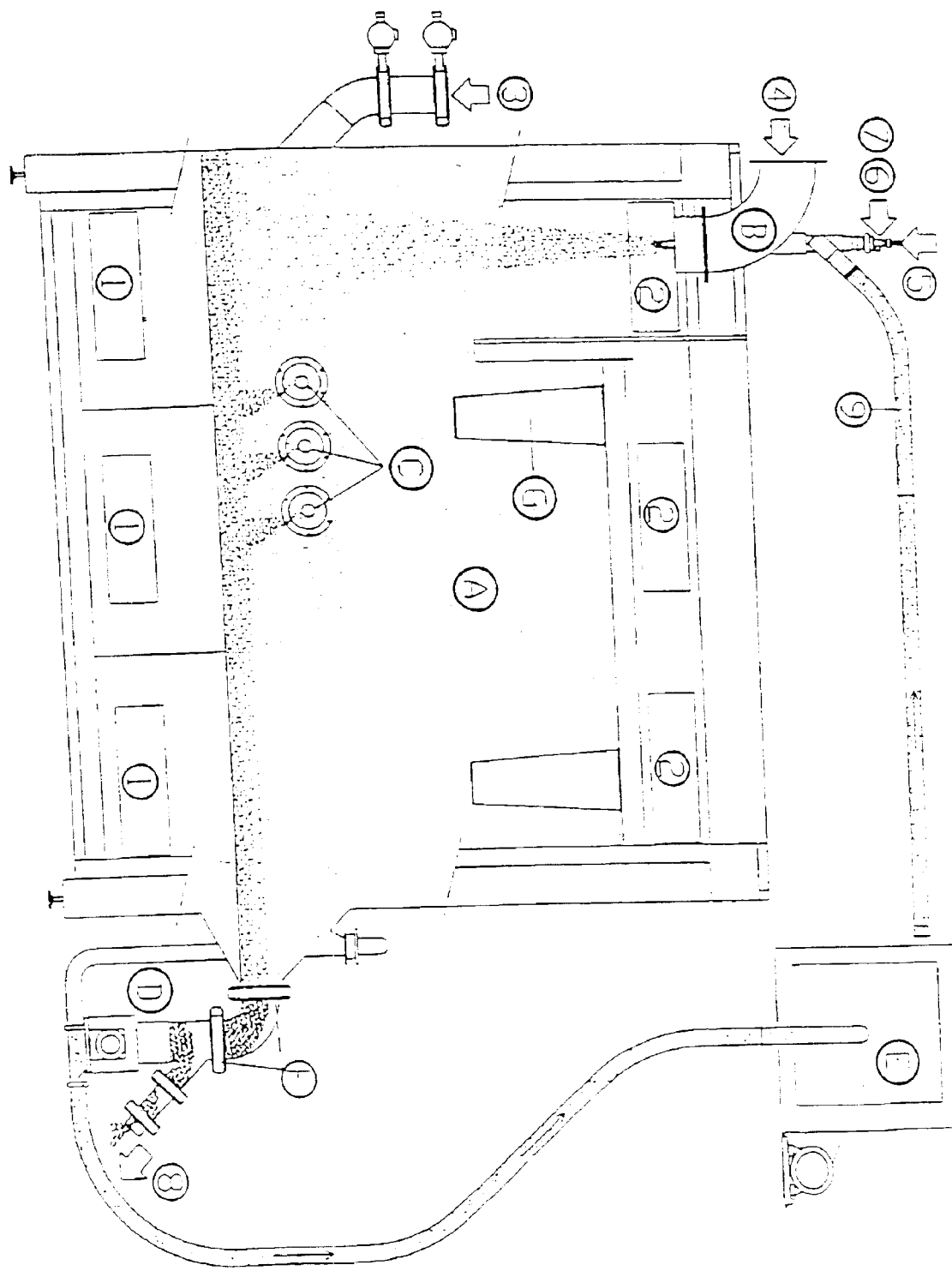
FIG. 1 depicts a side elevational view of an exemplary spray-drying plant.
Figure 2:
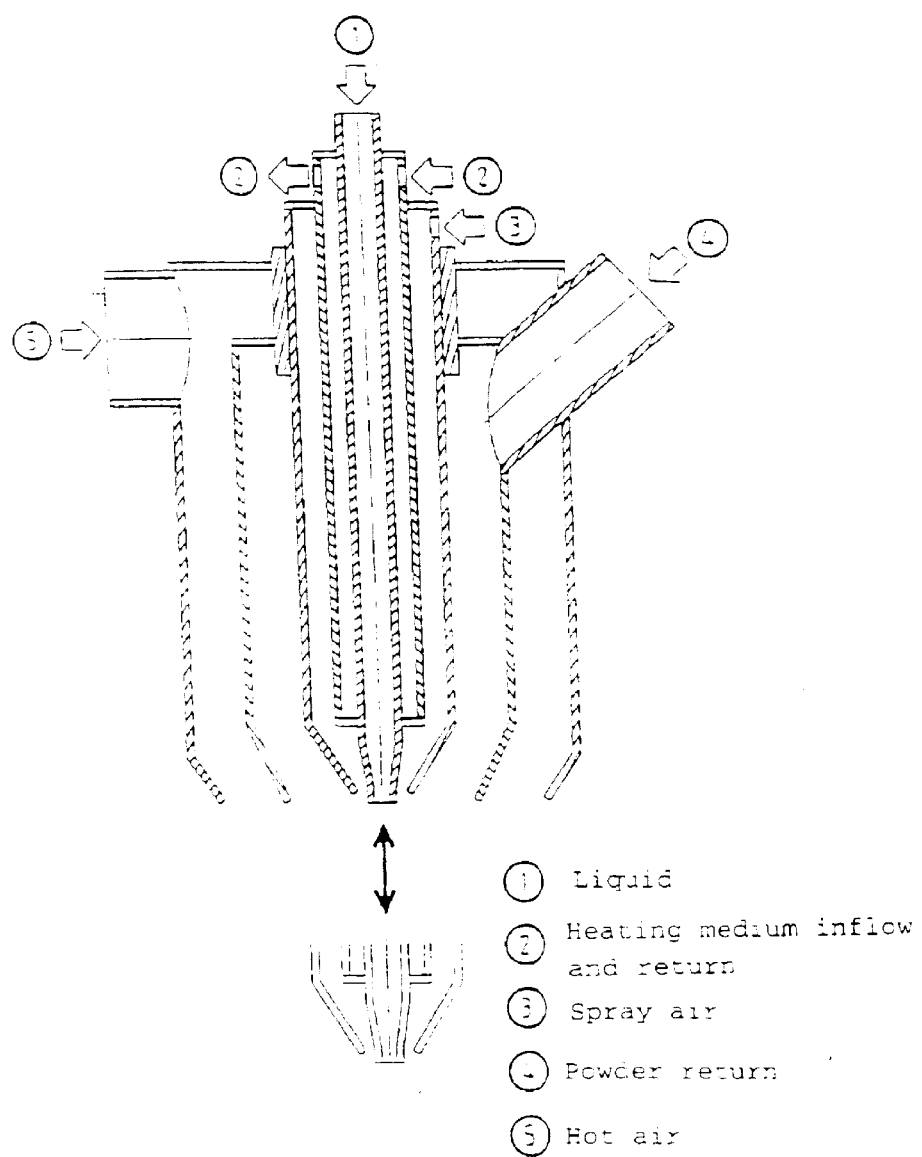
FIG. 2 depicts an elevational cross-sectional view of an exemplary spray nozzle.

Instead of the three granulation nozzles (C), as shown in FIG. 1, one or more spray nozzles or spray-drying nozzles or alternatively only one, two or more than three granulation nozzles may be installed at the corresponding point of the plant. These additional nozzles can be located directly at the beginning of the fluidized bed or moved further to the back. The choice of the location at which the powder material originally formed is re-sprayed once or more than once is also dependent, inter alia, on the residual moisture content that the desired product is intended to have. It goes without saying that a product having a particularly low residual moisture content requires a longer residence time in the fluidized bed after the final spraying than one with a relatively high residual moisture content.

If desired, different compositions can be applied through the various nozzles to the particle surfaces already formed, enabling particles having a layered structure to be obtained. However, it can also serve to achieve a more uniform particle size distribution.

Furthermore, the plant according to the invention can be operated not only with air as carrier medium, but it is also possible to operate the entire plant in circulation with an inert gas, such as, for example, nitrogen, or with carbon dioxide gas.

The plant is designed in such a way that the parameters amount of liquid, spray pressure, amount of powder returned, amount of hot gas, hot-gas temperature, amount of warm air and warm-air temperature can be regulated individually. The properties of the end product can be adjusted as desired with respect to the moisture content, the particle size and the particle size distribution through the amount of powder returned, the amount of liquid fed in and the spray pressure. Pulverulent products having particle sizes of from 50 to 1000 $\mu$m can be produced as desired in the plant described. Depending on the mode of operation, the particles can consist of a single chemical substance or exhibit a layered structure of different substances or, depending on the process parameters selected, have a more or less crystalline or predominantly amorphous structure, where, in the latter case, the particles can consist either of one component or a mixture of different components.

The formation of the particles is controlled, in particular, by a spray nozzle suitable for the production of spray-dried granular materials which is integrated into the plant. A corresponding embodiment of a spray nozzle of this type is shown in FIG. 2.

This spray nozzle is a spray system which consists of a two-component spray nozzle [(1), (2), (3)] which can be heated with hot water and is in turn fitted with a coaxially arranged powder return (4) and a hot-gas surrounding flow (5).

The advantage of this spray system is that the powder comes into contact directly at the outlet with the liquid droplets produced via the atomization air and is granulated or agglomerated. In order that the granules do not stick together and the surface moisture can be removed the spray and powder parts are enclosed in a stream of hot gas, where the requisite energy for evaporating the liquid is converted directly. Subsequent drying takes place in the fluidized bed.

In particular also through incorporation of this spray-drying system, it is possible to achieve specific particle sizes.

A particular advantage of this spray-drying plant therefore consists in that very different products can be produced in a single plant depending on the process parameters set and on the liquid media to be sprayed.

For better understanding and for illustration, a general flow chart (FIG. 1) of the spray-drying plant described and examples which come within the scope of protection of the present invention, but are not suitable for restricting the invention to these examples, are given below.

FIG. 1 shows a generalized flow chart of a possible embodiment of a spray-drying plant of this type, in which the numerals and/or letters given have the following meanings:

1 Air introduction chambers
2 Air outlet chambers
3 Fill port
4 Hot-air feed
5 Liquid feed
6 Spray air
7 Heating medium
8 Product
9 Powder
A. Fluidized-bed apparatus
B Spray-drying unit
C Granulation nozzles
D Powder metering device
E Fan for powder return
F Paddle valve
G Dynamic filter With reference to the components mentioned in the description and given in the flow chart, it is readily possible for the person skilled in the art to construct a corresponding plant by selecting commercially available individual components. It goes without saying to the person skilled in the art working in the specialist area that both additional electrical and mechanical control units must be incorporated for operating the plant in order to be able to regulate and vary the process parameters, as described.

What is claimed is:

1. A spray-drying plant, comprising:

a spray-drying unit;

a fluidized bed;

one or more spray or atomization nozzles installed in the fluidized bed at variable locations for a liquid medium;

a powder metering device; and a powder return with a fan.

2. The spray-drying plant according to claim 1, wherein the spray-drying unit is located in a spray tower above the fluidized bed which is downstream.

3. A spray-drying plant, comprising:

a spray-drying unit;

a fluidized bed;

one or more spray or atomization nozzles for a liquid medium;

a powder metering device following the fluidized bed wherein the powder metering device is separated off by a paddle valve and fed by an overflow; and a powder return with a fan.

4. A spray-drying plant, comprising:

a spray-drying unit;

a fluidized bed;

one or more spray or atomization nozzles for a liquid medium;

a powder metering device;

a powder return with a fan; and a fly conveyor for returning at least some product, optionally after comminution, to the spray-drying unit wherein the fan serves as a conveying element.

5. A spray-drying plant according to claim 4, wherein the fan simultaneously serves as a comminution unit for the returned powder.

6. A spray-drying plant, comprising:

a spray-drying unit;

a downstream fluidized bed; wherein the spray-drying unit is located in a spray tower above the downstream fluidized bed;

one or more additional spray or atomization nozzles for a first liquid medium in the spray tower;

a powder metering device; and a powder return with a fan, wherein a second liquid medium, a spray air, a powder material and a hot air are combined in the spray-drying unit.

7. The spray-drying plant as claimed in claim 6, wherein the spray-drying unit comprises a spray system which consists of a two-component spray nozzle heated by hot water with coaxially arranged powder return and hot-gas surrounding flow.

8. The spray-drying plant as claimed in claim 6, wherein one or more additional spray or atomization nozzles for the first liquid medium can be installed in the fluidized bed at variable locations.

9. The spray-drying plant as claimed in claim 6, wherein the fluidized bed is followed by the powder metering device, which is separated off by a paddle valve and is fed by an overflow.

10. The spray-drying plant as claimed in claim 6, wherein some of the product formed is returned, if desired after comminution, into the spray-drying unit via a fly conveyor, in which the fan serves as conveying element.

11. The spray-drying plant as claimed in claim 10, wherein the fan simultaneously serves as a comminution unit for the returned powder.

12. The spray-drying plant according to claim 6, wherein the spray-drying plant produces particles of 50–1000 $\mu$m.

13. The spray-drying plant according to claim 6, further comprising a filter in the spray tower for filtering gas exiting the spray tower.

14. The spray-drying plant according to claim 6, further comprising a filter for filtering the gas exiting the spray tower.

15. A spray-drying plant, comprising:

a spray-drying unit, wherein the spray-drying unit comprises a spray system which consists of a two-component spray nozzle heated by a hot water with a coaxially arranged powder return and a hot-gas surrounding flow;

a downstream fluidized bed;

wherein the spray-drying unit is located in a spray tower above the downstream fluidized bed;

one or more additional spray or atomization nozzles for a liquid medium in the spray tower;

a powder metering device; and a powder return with a fan.

16. A spray-drying plant, comprising:

a spray-drying unit;

a downstream fluidized bed;

wherein the spray-drying unit is located in a spray tower above the downstream fluidized bed;

one or more additional spray or atomization nozzles for a liquid medium in the spray tower;

a powder metering device;

a powder return with a fan; and a filter in the spray tower for filtering gas exiting the spray tower.

17. A spray drying plant, comprising:

a spray-drying unit;

a downstream fluidized bed;

wherein the spray-drying unit is located in a spray tower above the downstream fluidized bed;

one or more additional spray or atomization nozzles for a liquid medium in the spray tower;

a powder metering device;

a powder return with a fan; and a filter for filtering the gas exiting the spray tower.

* * * * *